Dec. 2, 1969          J. I. MILNE          3,482,078
HEATABLE FOOD CONTAINER
Filed July 1, 1966          2 Sheets-Sheet 1
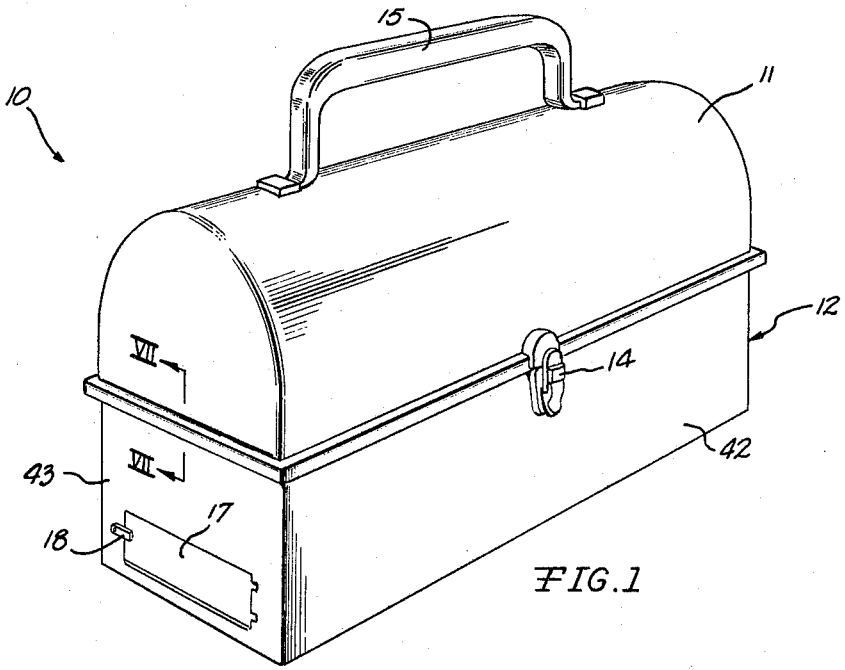
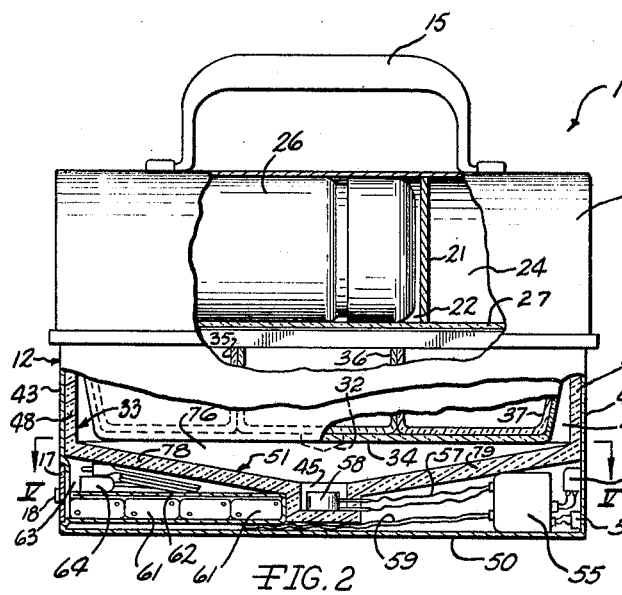
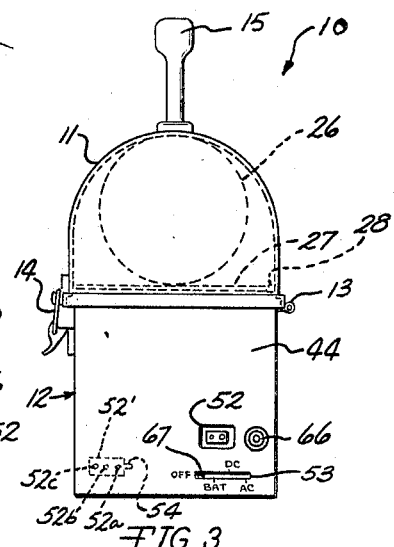
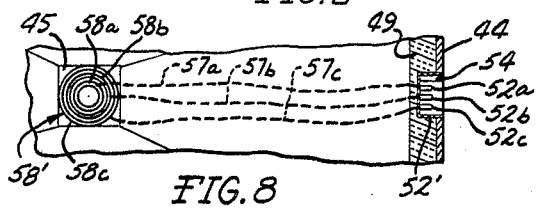
INVENTOR
JAMES I. MILNE
BY *Roy A. Plant*
ATTORNEY Dec. 2, 1969 J. I. MILNE 3,482,078
HEATABLE FOOD CONTAINER
Filed July 1, 1966 2 Sheets-Sheet 2
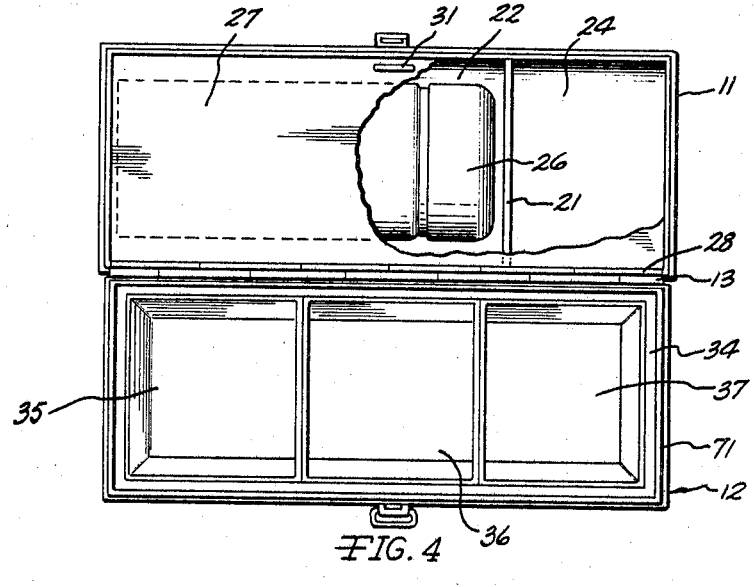
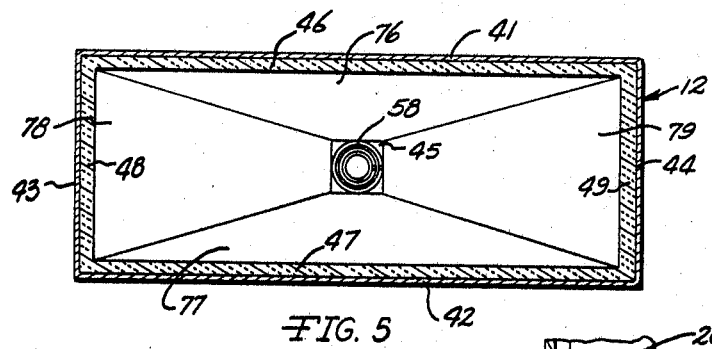
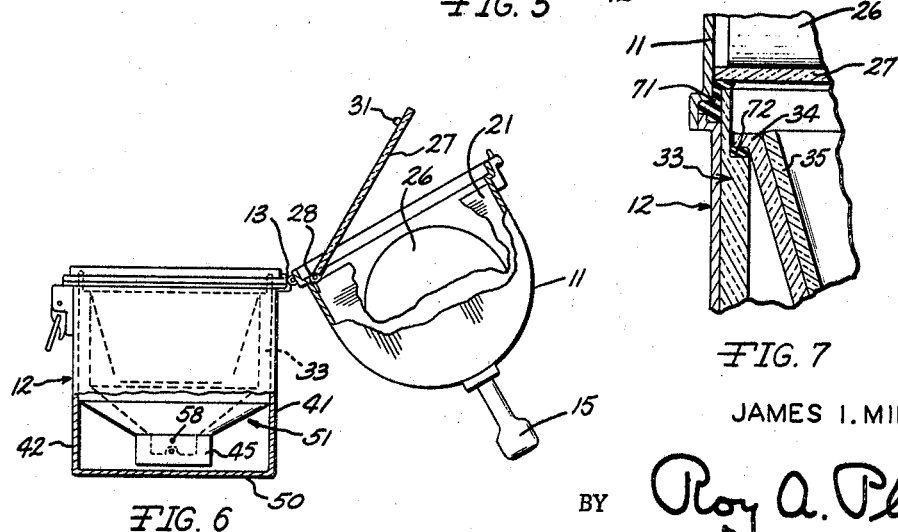
INVENTOR
JAMES I. MILNE
BY Roy A. Plant
ATTORNEY

United States Patent Office 3,482,078
Patented Dec. 2, 1969

3,482,078
HEATABLE FOOD CONTAINER
James I. Milne, R.R. 7, Box 2171,
Battle Creek, Mich. 49017
Filed July 1, 1966, Ser. No. 562,230
Int. Cl. F27d 11/00
U.S. Cl. 219—387                    12 Claims

ABSTRACT OF THE DISCLOSURE

The heatable food container is formed so as to permit heating a portion of the food in same while allowing another portion to remain relatively cool through the use of seals and partitions. The heating is also such that it can be done with either low voltage, such as by batteries, or high voltage, such as 110-volt house current while using automatic heat control for same.

BACKGROUND OF THE INVENTION

This invention relates broadly to a heated lunch bucket and more specifically to a chambered lunch bucket having an automatic heat control system.

With the great changes presently taking place in the social and economic lives of members of our modern society, there are many groups eating various meals away from home or other modern kitchen facilities. Many workers due to short lunch periods find that if they do not carry their lunch, the majority of time for lunch is spent going to and from food purchase centers and waiting in line to acquire the food, with very little time left for consumption. Other areas of modern society, such as recreational and sporting activities, have taken people away from easy access food centers. As our modern society gets more mechanized and sophisticated, there is a demand to provide better equipment for persons to handle meals taken away from the modern kitchen facilities available both at home and at commercial establishments. It is in recognition of the fact that no presently available heated lunch bucket has proved commercially successful which led to the conception and development of the present invention.

BRIEF DESCRIPTION OF DRAWINGS

Accordingly, among the objects of the present invention is the provision of a novel heated lunch bucket which will warm food to a predetermined heat level.

Another object of the present invention is to provide a heated lunch bucket having two moisture-proof chambers.

A further object of the present invention is to provide a heated lunch bucket which can be easily attached or operated by an electrical power source easily available to the consuming public.

A still further object of the present invention is to provide a heated lunch bucket which may be operated continuously or may be started to warm up food items prior to serving.

Another object of the present invention is to provide a heated lunch bucket having a separate vacuum bottle chamber from a food compartment chamber.

Still further objects and advantages of the invention will appear as the description proceeds.

To the accomplishment of the foregoing and related ends, the invention, then, consists of a heated lunch bucket member as hereinafter fully described and fully pointed out in the claims, the annexed drawings and the following description setting forth in detail certain means for carrying out the invention, such disclosed means illustrating, however, but one of the various ways in which the principle of the invention may be used.

In the annexed drawings:

FIGURE 1 is a perspective front view of a heated lunch bucket having the principles of the present invention.

FIGURE 2 is a front elevational view in partial cross section illustrating the lunch bucket shown in FIGURE 1 and showing the basic elements of the invention.

FIGURE 3 is an end elevational view of the lunch bucket illustrated in FIGURES 1 and 2 showing the switch location and the jack connections for use with external electrical power sources.

FIGURE 4 is a top plan view showing the lunch bucket of the present invention, as illustrated in FIGURES 2 and 3, in an open condition.

FIGURE 5 is a cross sectional view of the lunch bucket bottom member shown in FIGURES 1 and 2 taken along lines V—V of FIGURE 2.

FIGURE 6 is an end elevational view of the present invention partly in cross section showing an open lunch bucket similar to the illustration shown in FIGURE 4.

FIGURE 7 is an enlarged partial sectional view taken along line VII—VII of FIGURE 1, illustrating the sealing contacts between the various members of the heated lunch bucket and further illustrating principles of the present invention.

FIGURE 8 is a partial sectional view similar to part of FIGURE 5 and showing an alternate embodiment of an inlet jack and the electrical elements in the pocket of the lunch bucket bottom member.

DESCRIPTION OF SPECIFIC EMBODIMENTS

Referring to FIGURE 1, there is illustrated a lunch bucket generally referred to as 10 having a top member 11 and a bottom member 12. Top member 11 and bottom member 12 are swingably connected together by hinge assembly 13, as viewed in FIGURE 3 for example. The top member 11 and the bottom member 12 in their assembled or closed position, shown in FIGURES 1, 2 and 3, are locked together at their front panels by a locking latch assembly 14. This general combination and structure are well known in the art and are in common usage.

The lunch bucket 10 is provided with a handle 15 attached on top member 11 by which a user can carry the lunch bucket 10 from one area to another. As illustrated in FIGURE 1, the bottom member 12 has a cover plate 17, the full purpose of which will be explained in more detail below. The outer surface of the cover plate 17 can also be used to give the name identification information of the lunch bucket owner. A friction swing latch 18 is provided for holding the cover plate 17 in its proper position.

The inside surface of the top member 11 has a separator 21 which divides the inside portion of top member 11 into two sections. Generally these sections are used to provide a vacuum bottle chamber 22 and storage chamber 24. A vacuum bottle 26 can be positioned in the vacuum bottle chamber 22 for storage. Other desired food elements could be placed in storage chamber 24, either hot or cold, but in the preferred embodiment food elements which the user did not wish to have heated would be placed in storage chamber 24. A bottom door 27 is connected to one side of top member 11 by hinge member 28. The bottom door 27 forms a frictional lock across the opening of top member 11 and a handle 31 is provided for opening as illustrated in FIGURE 6. The bottom door 27 can be made af various materials. In the preferred embodiment it would be made of an insulated material, the full purpose of which will be explained in more detail below.

Bottom member 12 is provided with an insulation shell 33. A base tray 34 is provided as a utility bottom in the shell 33 of bottom member 12 of lunch bucket 10. Tray sections 35, 36 and 37 can be placed in base tray 34 for holding various types and styles of food. In some cases no tray sections would be needed and in other cases just one or two may be needed. The insulation shell 33 makes contact with the back wall 41, the front wall 42, and end walls 43 and 44 by its back section 46, front section 47, and end sections 48 and 49, respectively. As illustrated in FIGURES 2, 5 and 6, the bottom section 51 of insulation shell 33 tapers toward its center portion forming a pocket 45. Electrical elements 58 of the lunch bucket 10 are located in position for use in pocket 45, the full purpose and function of which will be discussed in more detail below. Sloping surfaces 76, 77, 78 and 79 of the bottom section 51 of insulation shell 33 are connected with sections 46, 47, 48 and 49, respectively. The bottom section 51 helps provide storage chambers between a bottom 50 of bottom member 12 and insulation shell 33.

Mounted on end wall 44 of bottom member 12 is an inlet jack 52 and a switch member 53, as viewed in FIGURES 2 and 3. The inlet jack 52 and the switch member 53 are electrically connected to a convertor unit 55. Lead lines 57 connect the convertor unit 55 to the electrical heater elements 58. Lead lines 59 connect the convertor unit 55 to a bank of batteries 61 which are stored in a battery chamber 62. These batteries can be reached by opening cover plate 17 when they need some type of maintenance or replacement. Storage area 63 is provided above the battery chamber 62. Various elements can be stored in this storage area 63. One of the specific elements which can be beneficially stored there would be electrical connecting wires 64. The electrical connecting wires 64 could be of various types. One type would be to connect inlet jack 52 to house current which would pass through convertor unit 55 to provide the necessary power to operate the electrical heater elements 58 from a house electrical outlet. An inlet jack 66 is also provided. This inlet jack can be used to connect the lunch bucket 10 into an automobile cigarette lighter electrical supply line, thus giving electrical power through the convertor unit 55 to the electrical heater elements 58. Switch 53 is provided with fingertip control 67 which is used to control the convertor unit 55 by being positioned at the proper position for the electrical source to be used. As viewed in FIGURE 3, positions on switch 53 are provided as OFF, BAT., DC and AC to indicate when the electrical current to the electrical heater element 58 is terminated, when the power source is to be self-contained storage batteries, automobile storage battery power, and regular home current, respectively.

A seal member 71 is provided at the top of bottom member 12, as viewed in FIGURE 7, and extends completely around its upper circumference. The seal member 71 contacts the bottom circumference of top member 11, including the outer lower circumference of bottom door 27. The seal member 71 provides an air- and moisture-proof seal around the lunch bucket 10 and when it has sealing contact with bottom door 27 it makes the inside chamber of top member 11 moisture-proof, too. The base tray 34 contacts a seal member 72 in its position along the inside circumferential surface of insulation shell 33, as viewed in FIGURE 7. In some embodiments base tray 34 could be a separate independent member contacting the seal member 72 by friction or locked into sealing contact by various means well known in the art but not shown. In other embodiments base tray 34 could be made as part of the insulation shell 33 with both members forming an integral unit. In either of these embodiments seal member 72 acts as an air- and moisture-proof seal means to form a moisture-proof chamber between the base tray 34 and the insulation shell 33. If the base tray 34 and the insulation shell 33 are inherent together as a single unitary structure a plug member 32 would be provided in the base tray 34 just above pocket 45. This would permit water to be added to the pocket 45, the purpose of which will be more fully explained below.

Electrical heater elements 58 turn themselves on when they are hooked up to an electrical source and fingertip control 67 of switch 53 is removed from the OFF position to the proper power source indication, and water is present in the pocket 45. The water acts as the contact means for electrical heater elements 58. Only a small amount of water is added to pocket 45 and as the electrical heater elements 58 turn on they will heat the water turning it into a vapor. As soon as enough water leaves the pocket 45 the electrical contact made by the water is broken terminating the flow of electric current, thus stopping the heating activity of the electrical heater elements 58. The heater elements 58 will again carry electrical current as soon as enough of the water vapor has condensed and drained back into pocket 45. This cycle will continually repeat itself. This vaporization and condensation cycle will provide a maximum and a minimum heat range which the lunch bucket 10 will operate between. The bottom sections of insulation shell 33 are made up of sloping surfaces 76, 77, 78 and 79 which are all tapered so that the condensed water vapor will drain toward and be deposited in pocket 45. This, of course, will continually keep the food items warm which are provided in tray sections 35, 36 and 37 or pass tray 34 if being used independently without the tray sections. By having the bottom door 27 insulated, the effect of the heating cycle will be very moderate if present at all on the food items in storage chamber 24. The vacuum bottle 36, of course, will maintain the proper temperature of the goods stored in that item acting independent of the rest of the lunch bucket 10. This will permit the use of either hot or cold liquids in the vacuum bottle 26.

It should be noted by the arrangement of seal members 71 and 72 and the construction of base tray 34 that there are three air- and moisture-proof chambers provided in the lunch bucket 10. The action of seal member 71 on the bottom door 27 and on top member 11 provides such a chamber in the inside of top member 11. This same action of seal member 71 and the action of seal member 72 with base tray 34 forms an air- and moisture-proof chamber between bottom door 27 and base tray 34. The action of seal member 72 between insulation shell 33 and base tray 34 provides an air- and moisture-proof chamber between these two members and prevents the water vapor produced by electrical heater elements 58 from escaping from this chamber. When the water condenses after the electrical power to electrical heater elements 58 has terminated, this condensated moisture will drain back into pocket 45, after a sufficient amount has returned the electrical contact of heater elements 58 will be completed again.

In the present application as viewed in FIGURES 2 and 3, there are provided separate inlet jacks 52 and 66. In some applications it may be beneficial to have a single inlet jack. In this application the connecting wires 64 would be provided with uniform heads to be inserted into the inlet jack but different heads for inserting into the external power supply would be provided at the other end. Another embodiment would be to have the connecting wire 64 provided with a single head for connection to the inlet jack on the end wall 44 of bottom member 12 and a dual head at the opposite end for inserting in the external power sources such as the cigarette lighter and home current, as referred to above.

Referring generally to FIGURES 3 and 8, an alternate embodiment of the electrical hookup between the inlet jack and the electrical elements is shown. FIGURE 3 shows an inlet jack 52′ having a tongue groove 54 which will safeguard proper electrical connections as will be disclosed in more detail below. The inlet jack 52′ has a common ground post 52a, a first alternate post 52b and a second alternate post 52c. Electrical elements 58' are positioned in pocket 45 similar th the positioning of electrical elements 58 as illustrated in FIGURE 2, for example. Electrical elements 58' are comprised of a common element 58a, a first alternate element 58b, and a second alternate element 58c. Post 52a is connected to electrical element 58a by lead line 57a. Post 52b is connected to electrical element 58b by lead line 57b. Post 52c is connected to electrical element 58c by the lead line 57c. The inlet jack 52' can be connected to various electrical power sources. An automobile electrical system is one example of such a power source; this could be either a twelve- or six-volt system which we would classify as low voltage. The connecting wire 64 used with this embodiment will have a tongue member on its socket head to act with tongue groove 54 to properly align the socket head with electrical posts 52a, 52b and 52c. For this low voltage application electrical connection would be made with posts 52a and 52b. Thus, the current would pass to electrical elements 58a and 58b through lead lines 57a and 57b, respectively. The water present in pocket 45 would provide the electrical contact between the two electrical elements 58a and 58b as discussed above in reference to electrical elements 58. If commercially available house current, which would be classified as a high voltage source, was to be used, a different connecting wire 64 would be utilized, again having a tongue member on its socket head which would align it properly by interacting with tongue groove 54. This embodiment would provide for the electrical connection to be made with common post 52a and post 52c, causing electrical current to pass to electrical elements 58a and 58c through lead lines 57a and 57c, respectively. Again the water present in pocket 45 would act as the connecting means between the two electrical elements with the electrical operations the same as discussed above. This type of electrical set-up would eliminate the necessity of a transformer referred to generally as convertor unit 55. In this type of operation the switch member 53 could also be eliminated. Also separate inlet jacks such as inlet jack 52 and inlet jack 66 could be provided with common post 52a being provided in each of the inlet jacks and being wired to the common electrical element 58a. A few of the various combinations of electrical connections and some of their alternates have been covered in detail but all the varied and numerous possibilities available have not been covered individually.

A preferred embodiment with several alternate elements embracing the principles of the present invention have been illustrated and described herein. However, it is understood that minor modifications may be made in the lunch bucket construction within the spirit and scope of the invention as herein defined and illustrated. It is further to be noted that while directional and positional terms have been used, same are not to be construed as a limitation on the invention since such use has been availed of to better describe the invention as illustrated.

Other modes of applying the principles of my invention may be employed instead of those explained, change being made as regards the details herein disclosed, provided the means and elements stated by any of the following claims or the equivalent of such stated means or elements be employed.

I therefore particularly point out and distinctly claim as my invention:

1. A heatable food container having, in combination:
   (a) a top member having at least one inner chamber,
   (b) a bottom member having at least one inner chamber,
   (c) a means to connect said two members together,
   (d) a first seal member making sealing contact around said top and bottom members,
   (e) heat elements positioned in the inner chamber of said bottom member,
   (f) means for turning on and off said heat elements,
   (g) a bottom door with hinges connected to said top member, and
   (h) said bottom door making sealing contact with said first seal member.

2. A container as specified in claim 1, having
   (a) an insulation shell positioned in said bottom member,
   (b) said shell making sealing contact with said first seal member, and
   (c) said heat elements are positioned in the bottom of said insulation shell.

3. A container as specified in claim 2, having
   (a) a base tray integral with said insulation shell, and
   (b) a plug member provided in the bottom of said base tray substantially over said heat elements.

4. A container as specified, in claim 2, having
   (a) said insulation shell having a bottom section with sloping surfaces,
   (b) said sloping surfaces being tapered towards substantially the center of said bottom section and forming a pocket, and
   (c) said heat elements are positioned in said pocket.

5. A container as specified in claim 4, having
   (a) a base tray in contact with and forming a chamber in the bottom of said insulation shell, and
   (b) a second seal making sealing contact between said base tray and said insulation shell.

6. A container as specified in claim 4, having
   (a) said bottom section separated from said bottom member forming chamber sections,
   (b) storage batteries provided in one of said chamber sections,
   (c) a switch mounted on said bottom member and electrically connected to said storage batteries, and
   (d) said switch electrically connected to said heat elements.

7. A container as specified in claim 6, having
   (a) an inlet jack mounted on said bottom member and electrically connected to said switch, and
   (b) connecting wires having a plug on one end to connect with said inlet jack and a plug on the other end to connect to a foreign electrical source.

8. A container as specified in claim 2, having
   (a) a base tray in contact with said insulation shell, and
   (b) said base tray forming a moisture-proof chamber in the bottom of said insulation shell where said heat elements are positioned.

9. A container as specified in claim 8, having
   (a) a second seal making sealing contact between said base tray and said insulation shell.

10. A heatable food container having, in combination
    (a) a top member having at least one inner chamber,
    (b) a bottom member having at least one inner chamber,
    (c) said top and bottom members hinged together,
    (d) a first seal member making sealing contact around said top and bottom members,
    (e) a bottom door connected to said container and making sealing contact between said top and bottom members,
    (f) heat elements positioned in the inner chamber of said bottom member, and
    (g) an inlet jack mounted on said container and electrically connected to said heat elements.

11. A container as specified in claim 10, having
    (a) said inlet jack having three post members,
    (b) one said post member being common, one post member being for low voltage, one post member being for high voltage,
    (c) said heat elements having three separate heat elements, and
    (d) one said heat element being common and connected to said common post, one heat element being for low voltage and connected to said low voltage post, one post member being for high voltage and connected to said high voltage post.

12. A container as specified in claim 11, having
(a) an insulation shell positioned in said bottom member,
(b) said shell making sealing contact with said first seal member,
(c) said heat elements are positioned in the bottom of said insulation shell,
(d) a base tray in contact with and forming a chamber in the bottom of said insulation shell, and
(e) a second seal making sealing contact between said base tray and said insulation shell.

References Cited

UNITED STATES PATENTS

| 2,205,884 | 6/1940 | Greenman | 219—397 |
|---|---|---|---|
| 2,973,756 | 3/1961 | Tylle | 126—266 |
| 3,105,138 | 9/1963 | Gazdik | 219—433 X |
| 3,219,798 | 11/1965 | Farrell | 219—387 |

FOREIGN PATENTS 660,759  11/1951  Great Britain.

BERNARD A. GILHEANY, Primary Examiner

P. N. ENVALL, Jr., Assistant Examiner

U.S. Cl. X.R.

126—266